United States Patent
Affa

(10) Patent No.: US 7,856,734 B2
(45) Date of Patent: Dec. 28, 2010

(54) LINEAR MEASURING ARRANGEMENT

(75) Inventor: Alfred Affa, Stein/Traun (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 226 days.

(21) Appl. No.: 12/231,607

(22) Filed: Sep. 4, 2008

(65) Prior Publication Data

US 2009/0071025 A1 Mar. 19, 2009

(30) Foreign Application Priority Data

Sep. 15, 2007 (DE) .................. 10 2007 044 128

(51) Int. Cl.
*G01B 11/04* (2006.01)
*G01B 7/00* (2006.01)

(52) U.S. Cl. ....................................... 33/706

(58) Field of Classification Search ............ 33/706–708
See application file for complete search history.

(56) References Cited

U.S. PATENT DOCUMENTS

| 4,492,032 A | | 1/1985 | Nelle | |
|---|---|---|---|---|
| 4,759,132 A | * | 7/1988 | Giacomello | .................. 33/706 |
| 4,982,508 A | * | 1/1991 | Nelle et al. | .................... 33/702 |
| 5,142,792 A | | 9/1992 | Nelle | |
| 6,578,283 B2 | | 6/2003 | Nishi | |
| 2002/0029488 A1 | | 3/2002 | Nishi | |
| 2004/0211078 A1 | * | 10/2004 | Kodama et al. | ............... 33/706 |

FOREIGN PATENT DOCUMENTS

| DE | 28 45 542 B1 | 5/1979 |
|---|---|---|
| DE | 32 01 887 A1 | 8/1983 |
| EP | 0 459 294 B1 | 12/1991 |
| EP | 1 180 662 A2 | 2/2002 |

* cited by examiner

*Primary Examiner*—Christopher W Fulton
(74) *Attorney, Agent, or Firm*—Brinks Hofer Gilson & Lione

(57) ABSTRACT

A linear measuring arrangement for measuring a relative position of two objects, the linear measuring arrangement including guide surfaces, a scale having a measuring graduation and a scanning carriage for scanning the measuring graduation, wherein the scanning carriage is linearly guided in a measuring direction on the guide surfaces. The linear measuring arrangement further including a carrier device which can be fastened to one of the two objects and a coupling, by which the scanning carriage is coupled to the carrier device rigidly in the measuring direction and transversely thereto resiliently. The coupling includes a first coupling element, having a first coupling face, arranged on the scanning carriage and a second coupling element, having a second coupling face, arranged on the carrier device, wherein the second coupling face contacts the first coupling face and wherein at least one of the first and second coupling elements is made of a ceramic material at least in an area of a contact.

17 Claims, 2 Drawing Sheets

LINEAR MEASURING ARRANGEMENT

RELATED APPLICATIONS

Applicants claim, under 35 U.S.C. §119, the benefit of priority of the filing date of Sep. 15, 2007 of a German patent application, copy attached, Serial Number 10 2007 044 128.4, filed on the aforementioned date, the entire contents of which is incorporated herein by reference.

BACKGROUND

1. Technical Field

The present invention relates to a linear measuring arrangement for measuring the relative position of two objects, having a scale, a scanning carriage for scanning a measuring graduation of the scale, and a coupling having a first and second coupling element, by which the scanning carriage is coupled to a carrier device which can be fastened to one of the two objects.

2. Background Information

Such linear measuring arrangements, described in DE 28 45 542 B1, DE 32 01 887 A1 and EP 0 459 294 B1, for example, are employed for measuring distances, as well as paths, and are used in particular in connection with processing machinery for measuring the relative movement of a tool in relation to a workpiece to be processed, in connection with coordinate-measuring machinery, and increasingly also in the semiconductor industry.

In this case a scale with a measuring graduation is used as the measuring representation, which is housed, protected against environmental effects, in a housing extending linearly in the measuring direction. The measuring graduation, which is incrementally or absolutely coded, is scanned by a scanning carriage during position measurement. To this end, the scanning carriage is linearly conducted in the measuring direction on two guide faces, which extend perpendicularly with respect to each other, and is pressed against these. This guidance has proven itself, because it is assured that a constant scanning distance between the scanning carriage, in particular the scanning plate, and the scale is maintained over the entire measurement length, which guarantees a good quality of the scanning signals. The guidance of the scanning carriage is disconnected from the guidance of the object to be measured in that a carrier device with a coupling is provided between the object to be measured and the scanning carriage and connects the scanning carriage to the carrier device rigidly in the measuring direction and resiliently transversely thereto.

In EP 0 459 294 the coupling consists of two coupling elements which contact each other. A sliding layer is provided for reducing the wear between the coupling elements contacting each other. This sliding layer is a thin sliding foil and is made, for example, of a PTFE-containing plastic material. In actual use, the coupling element in accordance with the prior art, which is fastened on the carrier device, was embodied as a steel pin, which is supported in a bore of the carrier device. Starting at the contact point, the pin was symmetrically designed. In order to bring the contact point as closely as possible to the neutral plane (fiber) of the scale, i.e. against the scale itself, the diameter of the pin was selected to be very small which, however, had a negative effect on stability.

The demands made on linear measuring arrangements become increasingly greater, greater resolution, as well as greater accuracy and reproducibility of the position measurements is constantly demanded. At the same time a compact mechanical structure is to be provided, and the linear measuring arrangement should be produced in a cost-effective manner.

OBJECTS AND SUMMARY OF THE INVENTION

It is an object of the present invention to create a linear measuring arrangement which has a highly reproducible measuring accuracy and can be produced in a cost-effective manner.

In accordance with the present invention, this object is attained in that at least one of the coupling elements is made of a ceramic material, at least in the area of contact.

A high degree of measuring accuracy requires a scanning distance which is constant over the entire measurement length. This is achieved by guiding the scanning carriage on the linear measuring arrangement itself, in particular on the scale. For a precise guidance of the scanning carriage, which is decoupled from the guidance accuracy of the object to be measured, the carriage is coupled to the carrier device by a coupling which is rigid in the measuring direction. The design in accordance with the present invention of the coupling makes possible a movement of the carrier device in all other directions without an effect on the precise guidance and movement of the scanning carriage in the measuring direction. Frictional properties, as well as wear properties, are optimized, along with the greatest possible stability and cost-effective production. A long service life, as well as a reproducible position measurement over this long service life, can be achieved.

It is intended by exemplary embodiments represented in the drawings to explain the concept on which the present invention is based and further characteristics and variants of the present invention.

DETAILED DESCRIPTION OF THE PREFERRED EMBODIMENTS

Figure 1:
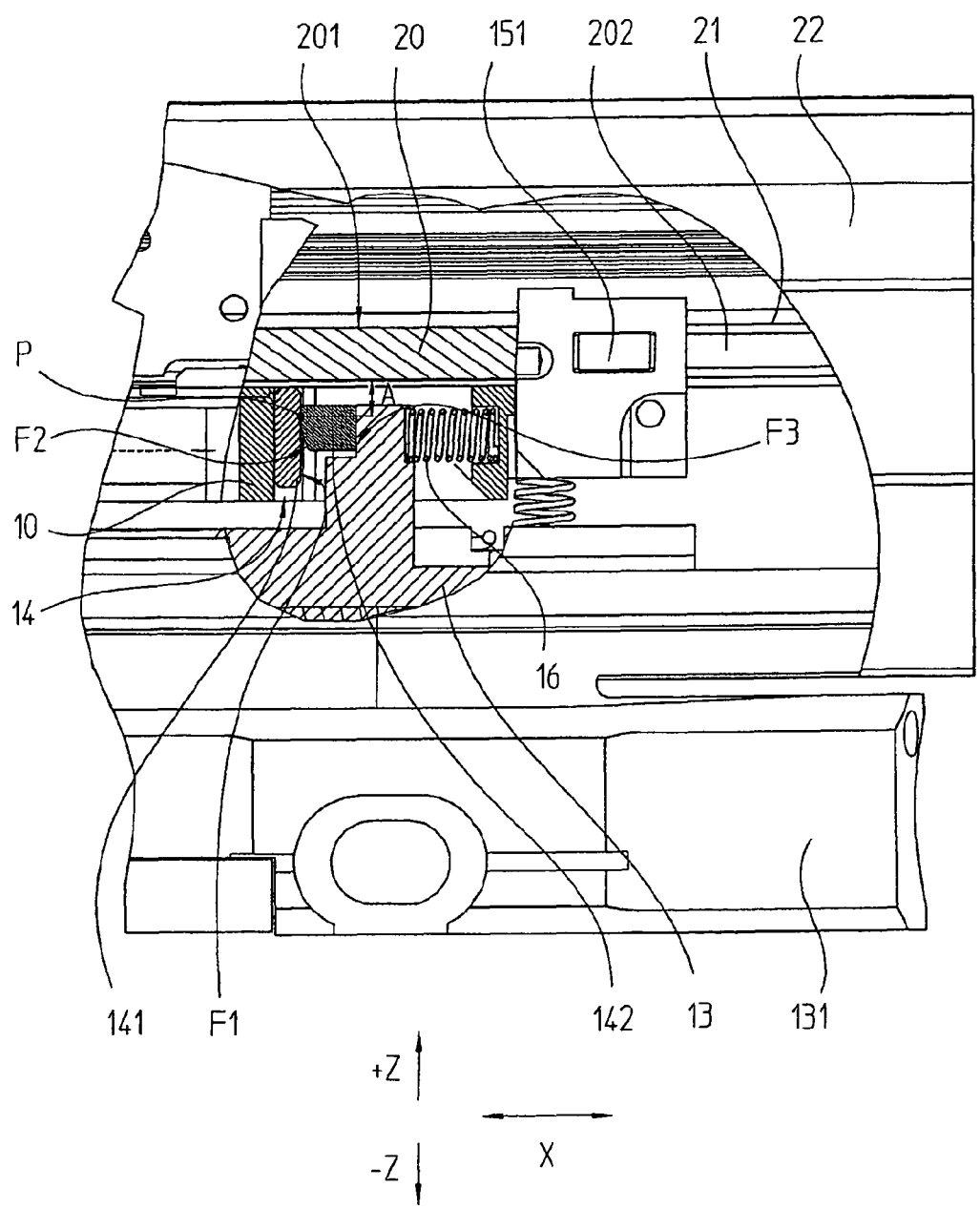
FIG. 1 shows a partial sectional view of an embodiment of a linear measuring arrangement in the measuring direction in accordance with the present invention.
Figure 2:
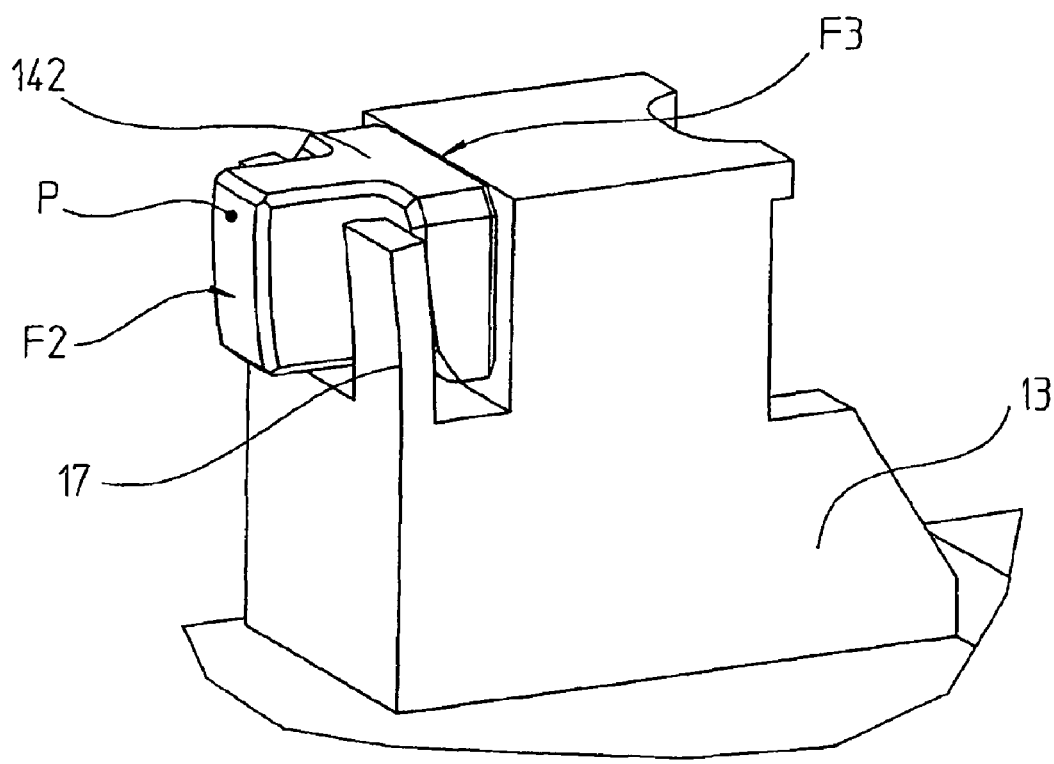
FIG. 2 shows a perspective plan view of an embodiment of a coupling element to be used with the linear measuring arrangement of FIG. 1 in accordance with the present invention.
Figure 2:
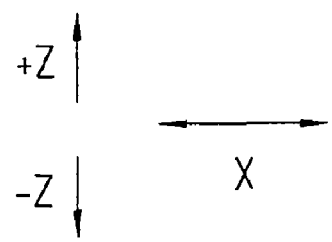

The present invention is represented by an example of an optical linear measuring arrangement, by which it is intended to measure the relative positions of two objects which can be displaced in relation to each other in the measuring direction X. In this case, a transparent scale 20, in particular made of glass, is scanned by a scanning carriage 10, which can be displaced in the measuring direction X in relation to the scale 20. The scale 20 has a measuring graduation 21, which is scanned by the scanning carriage 10 by transmitted light. The scanning carriage 10 has an illuminating unit for this purpose, which transmits a beam of light extending through the scale 20 and finally impinges on light-sensitive scanning sensors of the scanning carriage 10. In the course of this, the beam of light is modulated at the scale 20 by the measuring graduating 21 in a position-dependent manner.

The scale 20 is arranged inside a housing 22, which in turn is fastened on the object to be measured, for example a machine bed of a machine tool. Here, the scale 20 is connected in a known manner with the housing 22, for example by gluing or clamping. In its linear direction and extending in the measuring direction X, the housing 22 has a slit, which is closed by sealing lips inclined in a roof-like manner, through which a carrier device 13 extends with a sword-like center piece. The carrier device 13 has a mounting area 131, by which it can be fastened on the object which can be displaced relative to the machine bed, for example a carriage of the machine tool.

For exact parallel guidance along the scale 20, the scanning carriage 10 is guided on the latter. For this purpose, the scanning carriage 10 is supported via guide elements at two surfaces 201, 202 of the scale 10, which are oriented perpendicularly with respect to each other. One of these surfaces is the surface 201 supporting the measuring graduating 21, and the other a narrow side 202 of the scale 20 extending perpendicularly with respect to it. The guide elements can be sliding elements, however, they can in particular be cylinders or rollers 151, seated in roller bearings, of which only one is represented in FIG. 1.

A coupling 14 is arranged between the scanning carriage 10 and the carrier device 13, which connects the scanning carriage 10 to the carrier device 13 rigidly, and transversely thereto resiliently, in the measuring direction X. Because of this step, faulty alignments of the carrier device 13 are not transmitted to the scanning carriage 10. This coupling 14 has a first coupling element 141 at the scanning carriage 10 and a second coupling element 142 at the carrier device 13. During operation, a coupling face F1 of the first coupling element 141 is in constant contact with a coupling face F2 of the second coupling element 142. The first coupling element 141 is a plate, and the coupling face F1 is a flat surface oriented perpendicularly with respect to the measuring direction X. The coupling face F2 of the second coupling element 142 is embodied to be spherical, in particular ball-shaped, so that a point-like contact P results between the coupling face F1 of the first coupling element 141 and the coupling face F2 of the second coupling element 142.

A force-exerting element, a compression spring 16 in the example, provides a non-positive connection between the two coupling elements 141, 142. This arrangement results in an extremely rigid coupling in the measuring direction X. The remaining five degrees of freedom are not negatively affected in the course of relative movements between the scanning carriage 10 and the carrier device 13. These relative movements, caused by guidance errors between the machine guidance and the guidance of the scanning carriage 10 in the linear measuring arrangement, result in sliding of the spherically curved coupling face F2 of the second coupling element 142 along the flat coupling face F1 of the first coupling element 141.

At least one of the two coupling elements 141, 142 is made of a ceramic material, at least in the area of the contact point P. In the exemplary embodiment, both coupling elements 141, 142, namely the plate-shaped first coupling element 141 fixed in place on the scanning carriage 10 and the second coupling element 142, fixed in place on the carrier device 13 and having the spherical coupling face F2, are made of ceramic material.

The ceramic material is a non-metallic inorganic material. The use of an oxide-ceramic material, in particular zirconium oxide, is particularly advantageous.

The second coupling element 142 is supported by a contact face F3, which extends perpendicularly in relation to the measuring direction X, on the carrier device 13. This contact face F3 is arranged spaced apart in the measuring direction X from the coupling face F1 of the first coupling element 141, which contacts the coupling face F2. The spherical coupling face F2 of the second coupling elements 142 is in a point contact with the flat coupling face F1 of the first coupling element 141, and the location of this point-like contact P is at a distance A from the scale 20, wherein this distance A extends in a direction perpendicularly with respect to the measuring direction X. The contact face F3 has a dimension perpendicularly with respect to the measuring direction X which, starting from the location predetermined by the contact point P, is less by a multiple in the direction +Z of the scale 20 than in the direction −Z, i.e. pointing away from the scale 20. It is assured by this that the contact point P of the second coupling element 142 is arranged as closely as possible to the location of the neutral plane of the scale 20, as a rule the center of the scale 20, and that in spite of this the second coupling element 142 has a large contact face F3, and therefore great rigidity in the measuring direction X. This asymmetric design, viewed starting at the point P, can be produced especially simply by means of the selection of the material.

For simple mounting, the second coupling element 142 is fixed in place on the carrier device 13 by holding elements 17. These holding elements 17 have the function of a gluing arrangement provided on the carrier device 13, which securely fixes the second coupling element 142 in place on the carrier device 13 in a predetermined position until the adhesive has cured.

The particular advantages of the present invention lie in that the coupling 14 has great sturdiness and form stability, and therefore a particularly great rigidity in the measuring direction X. On the one hand, this advantage results because of the selection of the material, and is further improved by the design of the shape made possible by the selection of the material.

Good tribological properties at the contact point P of the coupling elements 141, 142 are achieved because of the selection of the material. No wear occurs, which could negatively affect the measuring accuracy. Also, no abraded material is created, which would dirty the scale 20 and would also negatively affect the quality of the scanning signals and therefore reduce the measuring accuracy.

The required shape and a surface, which is accurate in shape and smooth, can be achieved by the ceramic material with little outlay and therefore particularly cost-effectively in that the coupling elements 141, 142 are produced by a sintering process.

The present invention is not limited to a linear measuring arrangement based on the optical scanning principle. Scanning of the scale can also be capacitive, magnetic or inductive, for which the measuring graduation and the scanning sensors must be appropriately designed.

The foregoing description is provided to illustrate the present invention, and is not to be construed as a limitation. Numerous additions, substitutions and other changes can be made to the invention without departing from its scope as set forth in the appended claims.

I claim:

1. A linear measuring arrangement for measuring a relative position of two objects, the linear measuring arrangement comprising:
   guide surfaces;
   a scale comprising a measuring graduation;
   a scanning carriage for scanning said measuring graduation, wherein said scanning carriage is linearly guided in a measuring direction on said guide surfaces;
   a carrier device which can be fastened to one of said two objects;

a coupling, by which said scanning carriage is coupled to said carrier device rigidly in said measuring direction and transversely thereto resiliently, wherein said coupling comprises:
- a first coupling element arranged on said scanning carriage, said first coupling element comprising a first coupling face;
- a second coupling element arranged on said carrier device, said second coupling element comprising a second coupling face, wherein said second coupling face contacts said first coupling face;
- wherein at least one of said first and second coupling elements is made of a ceramic material at least in an area of a contact, wherein said ceramic material comprises zirconium oxide.

2. The linear measuring arrangement in accordance with claim 1, wherein both said first coupling element and said second coupling element are made of a ceramic material.

3. The linear measuring arrangement in accordance with claim 1, wherein another one of said first coupling element and said second coupling element is made of a ceramic material.

4. The linear measuring arrangement in accordance with claim 3, wherein said second coupling face is spherical.

5. The linear measuring arrangement in accordance with claim 4, wherein said first coupling face is a plane extending perpendicularly in relation to said measuring direction.

6. The linear measuring arrangement in accordance with claim 1, wherein said second coupling element comprises a body which is rigidly fastened on said carrier device and is supported on said carrier device by a third contact face extending perpendicularly with respect to said measuring direction, wherein said third contact face is spaced apart from said second coupling face in said measuring direction.

7. The linear measuring arrangement in accordance with claim 6, wherein said contact is shaped like a point and said third contact face has a dimension perpendicularly with respect to said measuring direction, wherein a first portion of the dimension extends from a location predetermined by said point in a direction pointing toward said scale and a remaining second portion of the dimension extends from said location in a direction pointing away from said scale, said first portion is a fraction in size of said remaining second portion.

8. The linear measuring arrangement in accordance with claim 1, further comprising a force-exerting element that urges said first and second coupling elements toward each other.

9. The linear measuring arrangement in accordance with claim 8, wherein said force-exerting element comprises a spring.

10. A linear measuring arrangement for measuring a relative position of two objects, the linear measuring arrangement comprising:
- guide surfaces;
- a scale comprising a measuring graduation;
- a scanning carriage for scanning said measuring graduation, wherein said scanning carriage is linearly guided in a measuring direction on said guide surfaces;
- a carrier device which can be fastened to one of said two objects;
- a coupling, by which said scanning carriage is coupled to said carrier device rigidly in said measuring direction and transversely thereto resiliently, wherein said coupling comprises:
  - a first coupling element arranged on said scanning carriage, said first coupling element comprising a first coupling face;
  - a second coupling element arranged on said carrier device, said second coupling element comprising a second coupling face, wherein said second coupling face contacts said first coupling face, wherein said second coupling element comprises a body which is rigidly fastened on said carrier device and is supported on said carrier device by a third contact face extending perpendicularly with respect to said measuring direction, wherein said third contact face is spaced apart from said second coupling face in said measuring direction; and
  - wherein at least one of said first and second coupling elements is made of a ceramic material at least in an area of a contact, wherein said contact is shaped like a point and said third contact face has a dimension perpendicularly with respect to said measuring direction, wherein a first portion of the dimension extends from a location predetermined by said point in a direction pointing toward said scale and a remaining second portion of the dimension extends from said location in a direction pointing away from said scale, said first portion is a fraction in size of said remaining second portion.

11. The linear measuring arrangement in accordance with claim 10, wherein said ceramic material comprises zirconium oxide.

12. The linear measuring arrangement in accordance with claim 10, wherein both said first coupling element and said second coupling element are made of a ceramic material.

13. The linear measuring arrangement in accordance with claim 10, wherein another one of said first coupling element and said second coupling element is made of a ceramic material.

14. The linear measuring arrangement in accordance with claim 13, wherein said second coupling face is spherical.

15. The linear measuring arrangement in accordance with claim 14, wherein said first coupling face is a plane extending perpendicularly in relation to said measuring direction.

16. The linear measuring arrangement in accordance with claim 10, further comprising a force-exerting element that urges said first and second coupling elements toward each other.

17. The linear measuring arrangement in accordance with claim 16, wherein said force-exerting element comprises a spring.

* * * * *